(12) United States Patent
Henrich et al.

(10) Patent No.: US 9,927,054 B2
(45) Date of Patent: Mar. 27, 2018

(54) PLUG-IN COUPLING ELEMENT

(71) Applicant: NORMA GERMANY GMBH, Maintal (DE)

(72) Inventors: Detlef Henrich, Limeshain (DE); Mathias Krauss, Nidderau (DE)

(73) Assignee: NORMA GERMANY GMBH, Maintal (DE)

( * ) Notice: Subject to any disclaimer, the term of this patent is extended or adjusted under 35 U.S.C. 154(b) by 94 days.

(21) Appl. No.: 14/579,369

(22) Filed: Dec. 22, 2014

(65) Prior Publication Data

US 2015/0267849 A1    Sep. 24, 2015

(30) Foreign Application Priority Data

Mar. 21, 2014 (DE) ........................ 10 2014 103 888

(51) Int. Cl.
| | | |
|---|---|---|
| *F16L 37/091* | (2006.01) | |
| *F16L 37/098* | (2006.01) | |
| *F16L 17/035* | (2006.01) | |
| *F16L 21/08* | (2006.01) | |

(52) U.S. Cl.
CPC .......... *F16L 37/091* (2013.01); *F16L 17/035* (2013.01); *F16L 37/0982* (2013.01); *F16L 37/0985* (2013.01); *F16L 21/08* (2013.01); *F16L 2201/10* (2013.01)

(58) Field of Classification Search
CPC . F16L 37/091; F16L 37/0985; F16L 37/0982; F16L 17/035
See application file for complete search history.

(56) References Cited

U.S. PATENT DOCUMENTS

| | | | |
|---|---|---|---|
| 2,675,829 A | | 4/1954 | Livers et al. |
| 3,065,002 A | * | 11/1962 | Waalkes .............. F16L 37/0985 |
| | | | 285/315 |
| 4,036,515 A | | 7/1977 | Karcher et al. |
| 5,040,829 A | * | 8/1991 | Sauer .................. F16L 33/2076 |
| | | | 285/256 |
| 5,094,493 A | | 3/1992 | Sauer |
| 7,857,361 B1 | | 12/2010 | Hanser et al. |

(Continued)

FOREIGN PATENT DOCUMENTS

| | | |
|---|---|---|
| CA | 2 752 275 | 3/2012 |
| DE | 912282 | 5/1954 |

(Continued)

OTHER PUBLICATIONS

Office action dated Jan. 19, 2016 of Japanese Application No. 2015-026302, with English language translation thereof.

(Continued)

*Primary Examiner* — David Bochna
*Assistant Examiner* — James A Linford
(74) *Attorney, Agent, or Firm* — Greenblum & Bernstein, P.L.C.

(57) ABSTRACT

A plug-in coupling element having a base body that includes a connection geometry for a fluid line and an accommodation opening. For a simplified installation, the claw array is arranged in the region of the accommodation opening, with the claw array including multiple claws arranged such that they are distributed in a circumferential direction, the claws being tilted from the radial outside to the radial inside.

13 Claims, 3 Drawing Sheets

(56) References Cited

U.S. PATENT DOCUMENTS

| | | | |
|---|---|---|---|
| 2005/0012331 A1 | 1/2005 | Beck et al. | |
| 2008/0036206 A1* | 2/2008 | Li-guo | F16L 37/0985 285/322 |
| 2008/0084061 A1 | 4/2008 | Kertesz et al. | |
| 2009/0032170 A1* | 2/2009 | Williams | F16L 37/091 156/91 |
| 2011/0121561 A1 | 5/2011 | Wang | |

FOREIGN PATENT DOCUMENTS

| | | |
|---|---|---|
| DE | 10 2006 047 882 | 8/2007 |
| DE | 102006047882 | 8/2007 |
| EP | 0340194 | 11/1989 |
| FR | 2827647 | 1/2003 |
| JP | Hei-07-504019 A | 4/1995 |
| JP | 2008-101775 A | 5/2008 |
| WO | 93/17271 A1 | 9/1993 |
| WO | 98/29680 | 7/1998 |

OTHER PUBLICATIONS

Russian Office Action issued in Patent Appl. No. 2015107166/12(011704), dated Dec. 23, 2015, along with an english translation thereof.
European Search Report for Application No. 14199954.0 dated May 15, 2015 with English Translation thereof.

\* cited by examiner

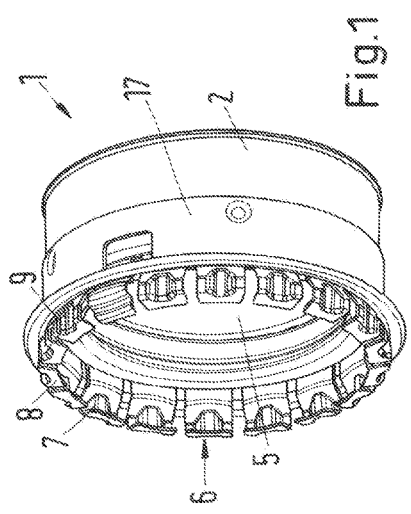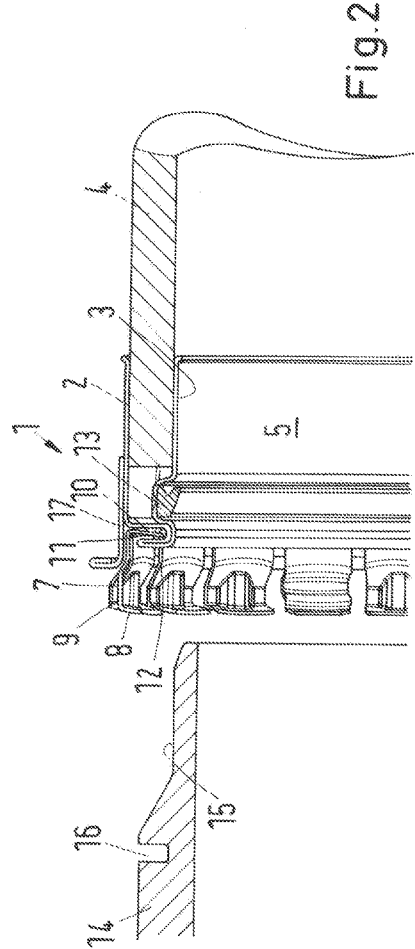

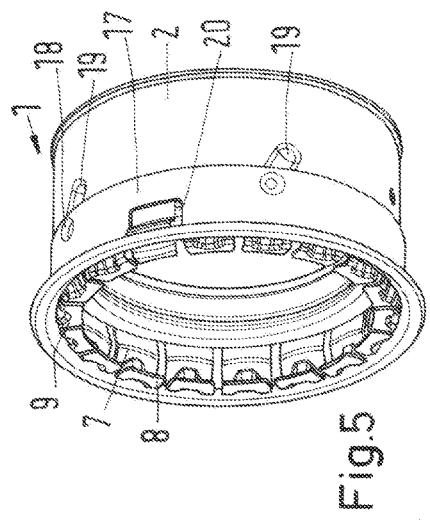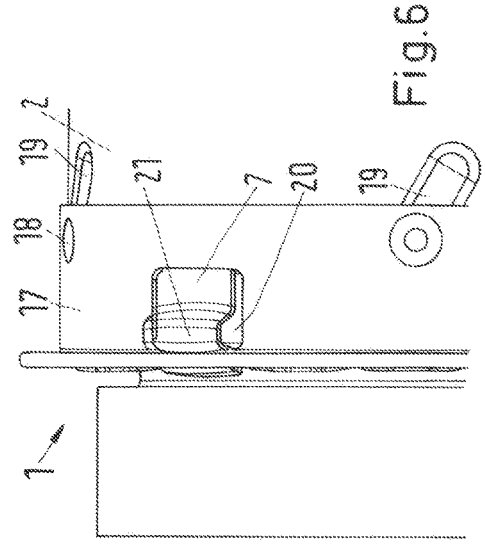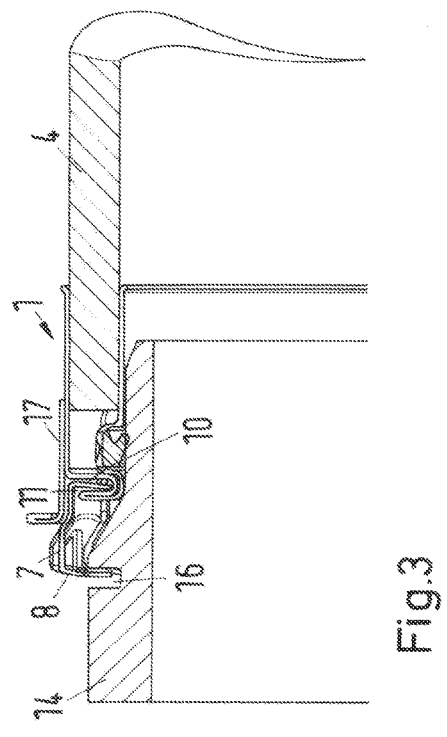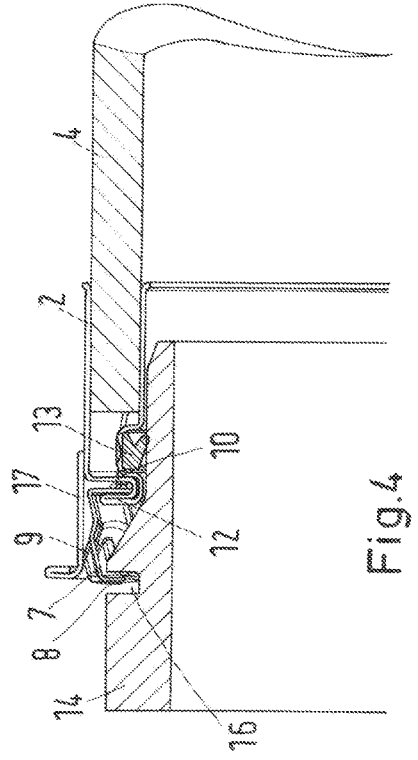

PLUG-IN COUPLING ELEMENT

CROSS-REFERENCE TO RELATED APPLICATION

The present application claims priority under 35 U.S.C. § 119(a) of German Patent Application No. 10 2014 103 888.6 filed Mar. 21, 2014, the disclosure of which is expressly incorporated by reference herein in its entirety.

BACKGROUND

1. Field of the Invention

The invention relates to a plug-in coupling element having a base body which comprises a connection geometry for a fluid line and an accommodation opening.

2. Background Information

A plug-in coupling element of this type is, for example, known from DE 10 2006 047 882 B3.

A plug-in coupling of this type is used, for example, to connect a fluid line that is provided with such a plug-in coupling to a connecting piece. For this purpose, the base body is slid with its accommodation opening on to the connecting piece. The fitter must thereby overcome the force of a locking mechanism that is in the known case necessary to spread open a split washer, which forms a locking device. If the connecting piece has been inserted far enough into the base body, then the split washer can, with a leg, engage in a groove on the connecting piece.

Since relatively high forces must be applied when mounting the plug-in coupling element onto the connecting piece, installation is laborious.

SUMMARY

A plug-in coupling element according to the invention is easy to install.

To this end, a plug-in coupling element of the invention, in the region of the accommodation opening, a claw array is arranged which comprises multiple claws arranged distributed in a circumferential direction, which claws can be tilted from the radial outside to the radial inside.

The claws comprise sections projecting radially inwards. For installation, the claws are tilted into their radial outer position. The claw sections projecting radially inwards then free a clear space through which the connecting piece can be inserted into the accommodation opening. If the plug-in coupling element and the connecting piece have been inserted far enough into one another, then the claws are tilted from the radial outside to the radial inside, so that the claw sections projecting radially inwards can engage in a groove on the connecting piece. Once the claws have entered the groove with their sections projecting radially inwards, it is no longer possible to pull the plug-in coupling element away from the connecting piece. However, no greater forces are required to mount the plug-in coupling element onto the connecting piece. The locking of the plug-in coupling element on the connecting piece occurs in a simple manner after the sliding-on in that the claws are tilted from the radial outside to the radial inside.

The claws are arranged on a claw ring that is attached to the base body. This facilitates installation. The claws can, for example, be embodied in one piece with the claw ring.

The claws are arranged on the base body with a preload in the radially outward direction. To lock the plug-in coupling element onto the connecting piece, it is merely necessary to allow a force to act on the claws from the radial outside towards the radial inside. An unlocking occurs automatically when this force is no longer present. Disassembly is thus also facilitated.

The base body comprises a circumferential groove open in a radially outward direction, in which groove the claw ring is arranged. The claw ring then forms, as it were, a foot part of the claws that projects radially inwards and therefore fixes all claws to the base body. It is already possible to introduce a certain preload in the connection between the claw ring and the claws. Thus, the claws can, for example, be bent inwards relative to the claw ring when they tilt from the radial outside to the radial inside. Another possibility is to allow the claw ring and the claws to tilt together. The claw ring can be interrupted in a circumferential direction in order to facilitate installation.

Here the claw ring has in an axial direction of the accommodation opening a lower thickness then the circumferential groove. The claw ring can thus tilt inside the accommodation opening, which facilitates the tilting of the claws themselves.

A sliding collar is provided that can be moved relative to the base body and, in a first position, acts radially inwards on the claws and, in a second position, frees a space for a tilting of the claws radially outwards. The sliding collar is a relatively simple means with which the claws can not only be moved radially inwards together, but also retained in the position tilted radially inwards. As long as the sliding collar is in the first position, the claws cannot tilt radially outwards and release the lock with the connecting piece.

The sliding collar can be moved with a component in an axial direction of the accommodation opening. The sliding collar is thus, once the plug-in coupling element has been slid onto the connecting piece, moved further in the direction towards the connecting piece, so that the fitter essentially only needs to execute a single movement in order to slide the plug-in coupling onto the connecting piece and lock it in this position.

The sliding collar can be moved with a component in a circumferential direction of the accommodation opening. In this case, the sliding collar can be rotated on the base body in a circumferential direction. In an exemplary embodiment, it is provided that a combination of a movement in an axial direction and in a circumferential direction is performed in order to move the sliding collar from the second position into the first position.

Here, it is advantageously provided that the sliding collar is guided in at least one guide groove on the base body. A path of movement of the sliding collar is thus predefined on the base body. The sliding collar can, for example, comprise a projection pointing radially inwards which is located in the groove.

The groove extends, at least in individual sections, in a helical shape. By means of the "skewed" groove, it is automatically ensured that the sliding collar simultaneously executes a certain rotational movement in a circumferential direction when it is moved in an axial direction of the accommodation opening.

The sliding collar comprises at least one opening, into which a claw enters in the first position of the sliding collar. The sliding collar is thus locked relative to the claw array, i.e., the sliding collar is retained in the locked position, that is, in the first position, by at least one claw. To release the lock, this claw must then be pressed out of the opening, that is, radially inwards.

The claw comprises a radial projection that enters into the opening in the first position. The claw that is used to lock the sliding collar relative to the claw array can thus also be used to lock the plug-in coupling element to the connecting piece. Because of the projection that enters into the opening, the corresponding claw does not need to be overly springable in a radially outward direction in order to achieve the lock between the claw array and the sliding collar. Of course, multiple openings distributed in a circumferential direction can be provided in the sliding collar, and it is also possible to provide a corresponding number of "locking claws."

BRIEF DESCRIPTION OF DRAWINGS

The invention is described below on the basis of an exemplary embodiment in connection with the drawing, wherein:

FIG. 1 shows a plug-in coupling element in an opened state;

FIG. 2 shows a schematic section through the plug-in coupling element and a connecting piece;

FIG. 3 shows the section according to FIG. 2 with the plug-in coupling element slid on;

FIG. 4 shows the section according to FIG. 2 with the plug-in coupling element locked;

FIG. 5 shows a perspective representation of the plug-in coupling element in a locked position;

FIG. 6 shows an enlarged illustration of the plug-in coupling element on the connecting piece.

DETAILED DESCRIPTION

Figure 7B:
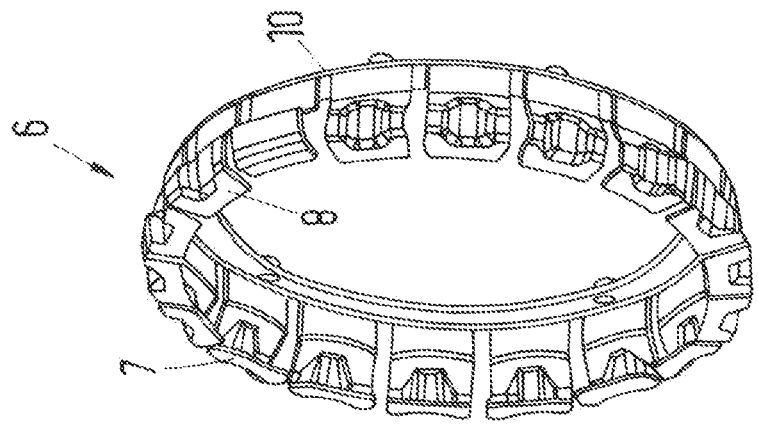
FIGS. 7a and 7b show a claw array in two different states.

FIG. 1 shows in a schematic perspective representation a plug-in coupling element 1 having a base body 2 which comprises a connection geometry 3 for a fluid line 4 (FIG. 2) and an accommodation opening 5.

A claw array 6 is arranged in the region of the accommodation opening 5. The claw array 6 comprises a plurality of claws 7 arranged distributed in a circumferential direction. The claws 7 are separated from one another in a circumferential direction. Each claw 7 comprises on its end facing away from the base body 2 a section 8 projecting radially inwards which can be embodied as a flat plate. Furthermore, each claw can on its radial outside comprise one or multiple beads 9 that are used to brace the claw.

As can be seen from FIG. 2, the claws 7 are attached to a claw ring 10. The claws 7 can be embodied in one piece with the claw ring 10. The claw ring 10 can have a gap in a circumferential direction in order to facilitate installation. The base body 2 comprises on its axial end facing away from the connection geometry 3 a groove 11 open in a radially outward direction, in which groove the claw ring 10 is arranged. Thus, the claw ring 10 is positioned on a radially outer surface of the base body 2. The claw ring 10 is a ring disc, the thickness of which in an axial direction is smaller than the axial extension of the groove 11. Accordingly, the claw ring 10 can tilt inside the groove. In the present section, the base body 2 is formed from a bent metal sheet. The groove 11 is formed in that an end 12 of the base body 2 is bent back radially outwards. It can also be produced in different manner, for example, milled, cut or molded.

A seal 13 is arranged in the accommodation opening.

In FIG. 2, the plug-in coupling element 1 is illustrated in front of a connecting piece 14. The connecting piece 14 comprises an insertion region 15, onto which the plug-in coupling element 1 can be slid and against which the seal 13 bears in the slid-on state. Furthermore, the connecting piece 14 comprises a circumferential groove 16, into which the radially inwards projecting sections 8 of the claws 7 protrude in the locked state (FIG. 4).

The plug-in coupling element 1 further comprises a sliding collar 17 that is movably arranged on the base body 2, that is, arranged radially outwardly of the base body. The movability of the sliding collar 17 on the base body 2 is, however, limited. The sliding collar 17 comprises, distributed in a circumferential direction, multiple projections formed by indentations 18, which projections protrude into the guide grooves 19 on the base body 2. The guide grooves 19 run in a helically-shaped or "skewed" manner. Thus, if the sliding collar 17 is moved into the position illustrated in FIG. 5 from the position illustrated in FIG. 1, then this is a movement that comprises a component in an axial direction (in relation to the axis of the accommodation opening 5) and a component in a circumferential direction, likewise in relation to the axis of the accommodation opening 5.

FIG. 3 shows the plug-in coupling element 1, which has been slid far enough onto the connecting piece 14 that the radially inwards projecting sections 8 of the claws 7 are located in the axial position of the groove 16. This is possible because the claws 7 are still tilted radially outwards and thus free a clear width or opening, through which the connecting piece 14 can be moved. The claw ring 10 is positioned in the circumferential groove 11 in a skewed, that is, tilted, manner.

If the sliding collar 17 on the base body 2 is then moved in the direction of the connecting piece 14, then this movement causes the sliding collar 17 to act on the claws 7 via the beads 9 and tilt the claws far enough radially inwards that the sections 8 projecting radially inwards enter into the groove 16 on the connecting piece 14. In this locked position, which can also be referred to as the "first position," the sliding collar 17 thus acts radially inwards on the claws 7 and securely retains the radially inwards projecting sections 8 of the claws 7 in the groove 16 of the connecting piece 14.

As can be established by a comparison of FIGS. 3 and 4, the claw ring 10 is positioned upright during this tilting movement of the claws 7. The claw ring 10 tilts past the upright position into the opposing oblique position. It then bears against the end 12 of the base body 2. At the same time, the connection between the claws 7 and the claw ring 10 is bent open slightly elastically, so that the claws 7 are provided with a preload in the radial outward direction relative to the base body 2. However, this preload cannot result in a tilting of the claws 7 radially outwards, since a movement of this type is blocked by the sliding collar 17.

As can be seen in FIGS. 5 and 6 in particular, the sliding collar 17 comprises in its circumferential wall at least one opening 20, into which a claw 7 protrudes and engages in the first position with a projection 21. Since the sliding collar 17 requires a rotational movement during its movement from the first position illustrated in FIG. 4 into the second position illustrated in FIG. 2 or 3, in which the collar frees a space for moving the claws 7 radially outwards, but because a rotational movement of this type is blocked by the projection 21 of the claw 7 protruding through the opening, the sliding collar 17 cannot be moved from the first position into the second position without difficulty. If a fitter wishes to once again release the coupling connection produced with the aid of the plug-in coupling element 1, the claw 7 with the projection 21 would need to first be pressed radially inwards in order to allow a rotational movement of the sliding collar 17 onto the base body 2.

When the sliding collar 17 has been moved into the second position (FIGS. 2 and 3), the claws 7 tilt radially outwards again, so that the sections 8 projecting radially inwards come free of the groove 16 of the connecting piece 14. In this state, the plug-in coupling element 1 can be pulled away from the connecting piece 14.

Figure 7A:
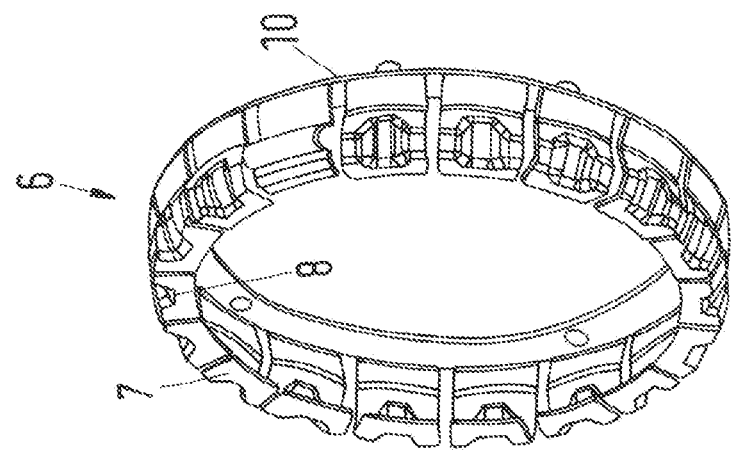

FIG. 7a shows the claw array 6 in a locked state, whereas FIG. 7b shows the claw array 6 in an opened state.

In the locked state according to FIG. 7a, the claws 7 are tipped radially inwards so that the sections 8 delimit a space that is smaller than in the open state, in which the space delimited by the sections 8 of the claws 7 has a larger diameter. In the opened state according to FIG. 7b, the plug-in coupling element 1 can be pulled away from the connecting piece 14. This is not possible in the locked state according to FIG. 7a.

The claw ring 10 can be made of an elastic or even springable material. The claw ring 10 can be made of a metal, for example spring steel, or from a plastic with corresponding properties.

For the installation of the plug-in coupling element 1 on the connecting piece 14, the sliding collar 17 must be in the second position, so that the claws 7 are tilted radially outwards. The fitter can then slide the plug-in coupling element 1 onto the attachment piece 14. Here, it is merely necessary to apply a force which overcomes the friction of the seal 13 on the connecting piece 14. However, this force is smaller than a force that is necessary to spread apart fastening elements, for example.

Only after the plug-in coupling element is in the desired installation position is the sliding collar 17 moved on the base body 2 and does it thus tilt the claws 7 radially inwards so that the sections 8 projecting radially inwards enter into the groove 16 and then securely retain the plug-in coupling element 1 on the connecting piece 14. In this position, the projection 21 engages in the opening 20 in the sliding collar 17, so that a movement of the sliding collar 17 into the second position is no longer possible. An inadvertent release of the plug-in coupling element from the connecting piece 14 is thus eliminated.

When the claws 7 tilt radially inwards, and possibly also when the claws 7 move radially outwards, a clicking sound results, as is known from a "clicker" children's toy, for example. Thus, a fitter also receives a reliable acoustic indication of whether or not the locking has occurred in the desired manner. If the clicking sound is heard, then the fitter can be certain that the claws 7 have tilted or sprung radially inwards. If, however, this movement of the claws 7 is not possible, because the groove 16 is blocked by a foreign object, for example, it is not possible for the clicking sound to occur.

The invention claimed is:

1. Plug-in coupling element comprising:
   a base body comprising:
      a connection geometry configured to connect the base body to a fluid line; and
      an accommodation opening;
   a claw array arranged in a region of the accommodation opening, the claw array comprising:
      a claw ring attached to the base body; and
      multiple claws arranged, by being distributed circumferentially, on the claw ring;
      the multiple claws being configured to be tilted from a radial outer position to a radial inner position;
   a sliding collar configured to be moved in relation to the base body, and on the base body, between a first position and a second position;
   wherein, in the first position the sliding collar acts radially inwards on the claws and, in the second position, the sliding collar frees the claws to tilt to the radial outer position;
   wherein, the sliding collar is movable with a component in an axial direction of the accommodation opening; and
   wherein, movement of the sliding collar is guided by means of at least one guide groove on the base body.

2. Plug-in coupling element according to claim 1, wherein:
   the claws are fixedly attached to the claw ring.

3. Plug-in coupling element according to claim 1, wherein:
   the claws are embodied in one piece with the claw ring.

4. Plug-in coupling element according to claim 1, wherein:
   the claws are attached to the base body with a preload in a radially outward direction.

5. Plug-in coupling element according to claim 1, wherein:
   the base body comprises a circumferential groove open in a radially outward direction; and
   the claw ring is arranged in the groove.

6. Plug-in coupling element according to claim 5, wherein:
   the claw ring has, in an axial direction of the accommodation opening, a lesser thickness than a thickness of the circumferential groove.

7. Plug-in coupling element according to claim 1, wherein:
   the sliding collar is movable with a component in a circumferential direction of the accommodation opening.

8. Plug-in coupling element according to claim 1, wherein:
   the guide groove extends, at least in individual sections, to move the sliding collar helically in relation to the base body.

9. Plug-in coupling element according to claim 1, wherein:
   the sliding collar comprises at least one opening and, in the first position of the sliding collar, one of the claws enters into the at least one opening.

10. Plug-in coupling element according to claim 9, wherein:
    the claw comprises a radial projection and the radial projection enters into the at least one opening in the first position of the sliding collar.

11. Plug-in coupling element according to claim 1, wherein:
    the sliding collar is arranged radially outwardly of the base body.

12. Plug-in coupling element according to claim 1, wherein:
    the sliding collar is configured to be moved in relation to body the claw ring and the base body between the first position and the second position.

13. Plug-in coupling element according to claim 1, wherein:
    the claw ring is positioned on a radially outer surface of the base body.

* * * * *